United States Patent
Stöckl et al.

(10) Patent No.: US 12,400,446 B2
(45) Date of Patent: Aug. 26, 2025

(54) LIVE POSSESSION VALUE MODEL

(71) Applicant: STATS LLC, Chicago, IL (US)

(72) Inventors: Michael Stöckl, Munich (DE); Patrick Joseph Lucey, Chicago, IL (US); Daniel Dinsdale, London (GB); Thomas Seidl, Munich (DE); Paul David Power, Leeds (GB); Nils Sebastiaan Mackaij, Amsterdam (NL); Joe Dominic Gallagher, Wirral (GB)

(73) Assignee: STATS LLC, Chicago, IL (US)

( * ) Notice: Subject to any disclaimer, the term of this patent is extended or adjusted under 35 U.S.C. 154(b) by 496 days.

(21) Appl. No.: 17/812,571

(22) Filed: Jul. 14, 2022

(65) Prior Publication Data

US 2023/0031622 A1     Feb. 2, 2023

Related U.S. Application Data

(60) Provisional application No. 63/203,240, filed on Jul. 14, 2021.

(51) Int. Cl.
*G06V 20/40*     (2022.01)
*G06N 20/20*     (2019.01)

(52) U.S. Cl.
CPC ............. *G06V 20/44* (2022.01); *G06N 20/20* (2019.01)

(58) Field of Classification Search
CPC ........ A63B 71/06; G06V 20/20; G06V 20/42; G06V 20/44; G06V 10/82; G06N 20/00
See application file for complete search history.

(56) References Cited

U.S. PATENT DOCUMENTS

| | | | |
|---|---|---|---|
| 10,220,290 B1* | 3/2019 | Podolosky | ......... A63B 71/0669 |
| 2018/0032858 A1 | 2/2018 | Lucey et al. | |
| 2020/0250828 A1* | 8/2020 | Zhao | ....................... G06T 7/136 |
| 2020/0279160 A1 | 9/2020 | Holbrook et al. | |
| 2020/0342233 A1 | 10/2020 | Chang et al. | |

(Continued)

FOREIGN PATENT DOCUMENTS

WO     2019144143 A1     7/2019

OTHER PUBLICATIONS

Wang, et al. (Match Tracing: A Unified Framework for Real-time Win Prediction and Quantifiable Performance Evaluation). (Year: 2020).*

(Continued)

*Primary Examiner* — Daniel G Mariam
(74) *Attorney, Agent, or Firm* — Bookoff McAndrews PLLC

(57) ABSTRACT

A computing system receives a plurality of game files corresponding to a plurality of games across a plurality of seasons. The computing system generates a prediction model configured to generate a possession value for an event. The computing system receives a target event, in real-time or near real-time, from a tracking system monitoring a target game. The computing system generates target features for the target event based on target event data associated with the target event. The computing system generates, via the prediction model, a target possession value for the target event based on the target event data and the target features. The target possession value represents a likelihood that a team with possession will score within a following x-seconds after the target event.

20 Claims, 6 Drawing Sheets

(56) References Cited

U.S. PATENT DOCUMENTS

2020/0353311 A1  11/2020  Ganguly et al.

OTHER PUBLICATIONS

PCT International Application No. PCT/US22/37102, International Search Report and Written Opinion of the International Searching Authority, dated Nov. 16, 2022, 10 pages.
Bransen, et al., "Measuring football players' on-the-ball contributions from passes during games," International Workshop on machine learning and data mining for sports analytics, Springer, Cham, 2018, 13 pages.
Decroos, et al., "Actions speak louder than goals: Valuing player actions in soccer," Proceedings of the 25th ACM SIGKDD international conference on knowledge discovery & data mining, 2019, 11 pages.

\* cited by examiner

PASSES

| | team | player_image | player_name | passesPlus | | team | player_image | player_name | passesMinus |
|---|---|---|---|---|---|---|---|---|---|
| 0 | | | Shaw, Luke | 0.34611 | 0 | | | Phillips, Kalvin | -0.09013 |
| 1 | | | Kroos, Toni | 0.21297 | 1 | | | Müller, Thomas | -0.08126 |
| 2 | | | Havertz, Kai | 0.1632 | 2 | | | Sterling, Raheem | -0.06638 |
| 3 | | | Trippier, Kieran | 0.07974 | 3 | | | Walker, Kyle | -0.0579 |
| 4 | | | Kimmich, Joshua | 0.06991 | 4 | | | Havertz, Kai | -0.05444 |
| 5 | | | Hummels, Mats | 0.06473 | 5 | | | Trippier, Kieran | -0.04883 |

CROSSES

| | team | player_image | player_name | crossesPlus | | team | player_image | player_name | crossesMinus |
|---|---|---|---|---|---|---|---|---|---|
| 0 | | | Trippier, Kieran | 0.27987 | 0 | | | Gosens, Robin | -0.1006 |
| 1 | | | Walker, Kyle | 0.10713 | 1 | | | Kroos, Toni | -0.08647 |
| 2 | | | Neuer, Manuel | 0 | 2 | | | Trippier, Kieran | -0.06732 |
| 3 | | | Ginter, Matthias | 0 | 3 | | | Kimmich, Joshua | -0.04617 |
| 4 | | | Havertz, Kai | 0 | 4 | | | Werner, Timo | -0.04042 |
| 5 | | | Rice, Declan | 0 | 5 | | | Havertz, Kai | -0.01044 |

FIG. 5

LIVE POSSESSION VALUE MODEL

CROSS-REFERENCE TO RELATED APPLICATIONS

This application claims priority to U.S. Provisional Application Ser. No. 63/203,240, filed Jul. 14, 2021, which is hereby incorporated by reference in its entirety.

FIELD OF THE DISCLOSURE

The present disclosure generally relates to system and method for generating a live possession value using machine learning techniques.

BACKGROUND

Increasingly, sports fans and data analysts have become entrenched in sports analytics. In some situations, sports fans and data analysts alike seek real-time or near real-time statistics related to an ongoing event. Additionally, sports teams are interested in receiving more granular analytics at a faster speed during the course of the game.

SUMMARY

In some embodiments, a method is disclosed herein. A computing system receives a plurality of game files corresponding to a plurality of games across a plurality of seasons. The computing system generates a prediction model configured to generate a possession value for an event by identifying a plurality of events occurring across the plurality of games, for each event, generating features corresponding to that event based on event data associated with that event, generating a training data set comprising the plurality of events, the associated event data, and the associated features, and learning, by the prediction model, to generate a possession value for each event of the plurality of events based on the training data set. The computing system receives a target event, in real-time or near real-time, from a tracking system monitoring a target game. The computing system generates target features for the target event based on target event data associated with the target event. The computing system generates, via the prediction model, a target possession value for the target event based on the target event data and the target features. The target possession value represents a likelihood that a team with possession will score within a following x-seconds after the target event.

In some embodiments, a system is disclosed herein. The system includes a processor and a memory. The memory has programming instructions stored thereon, which, when executed by the processor, causes the system to perform operations. The operations include receiving a plurality of game files corresponding to a plurality of games across a plurality of seasons. The operations further include generating a prediction model configured to generate a possession value for an event by identifying a plurality of events occurring across the plurality of games, for each event, generating features corresponding to that event based on event data associated with that event, generating a training data set comprising the plurality of events, the associated event data, and the associated features, and learning, by the prediction model, to generate a possession value for each event of the plurality of events based on the training data set. The operations further include receiving a target event, in real-time or near real-time, from a tracking system monitoring a target game. the operations further include generating target features for the target event based on target event data associated with the target event. The operations further include generating, via the prediction model, a target possession value for the target event based on the target event data and the target features. The target possession value represents a likelihood that a team with possession will score within a following x-seconds after the target event.

In some embodiments, a non-transitory computer readable medium is disclosed herein. The non-transitory computer readable medium includes one or more sequences of instructions that, when executed by one or more processors, causes a computing system to perform operations. The operations include receiving, by the computing system, a plurality of game files corresponding to a plurality of games across a plurality of seasons. The operations further include generating, by the computing system, a prediction model configured to generate a possession value for an event by identifying a plurality of events occurring across the plurality of games, for each event, generating features corresponding to that event based on event data associated with that event, generating a training data set comprising the plurality of events, the associated event data, and the associated features, and learning, by the prediction model, to generate a possession value for each event of the plurality of events based on the training data set. The operations further include receiving, by the computing system, a target event, in real-time or near real-time, from a tracking system monitoring a target game. The operations further include generating, by the computing system, target features for the target event based on target event data associated with the target event. The operations further include generating, by the computing system via the prediction model, a target possession value for the target event based on the target event data and the target features. The target possession value represents a likelihood that a team with possession will score within a following x-seconds after the target event.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 5 illustrates a graphical representation of individual player metrics, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Previously, models have been developed that may assign action values to event data (e.g., passes, cross, free kicks, shot attempts, etc.) in sports. The idea behind this modeling is to be able to assess the performance of players and/or teams. Of particular interest to sports fans, commentators, and teams alike is how much value, if any, a player added to a team's play, the team's scoring opportunities, and the team's ultimate conversion on those scoring opportunities. Conventional attempts to quantify this data typically involve post-hoc analyses based on post-match or post-game data.

One or more techniques provided herein improve upon conventional systems by providing a model that is designed to be applied in a live or real-time environment. For example, one or more techniques provided herein include the development of a model that is able to process noisy live or real-time data to predict a likelihood that a team will score within the next X-seconds of an event occurring. In other words, the present model improves upon conventional models substantially by no longer being limited to post-hoc analyses. Instead, the present model can be deployed in real-time to provide real-time or near real-time predictions to end users.

In some embodiments, one or more techniques provided herein may leverage the scoring prediction generated by the model to derive additional metrics on both the team-level and player-level. For example, the present system may generate a momentum metric. The momentum metric may consider each team's possession values by relating them to each other to determine which team had momentum at certain points in the event. In another example, the present system may be configured to derive possession values on the individual level. For example, the present system may leverage the raw possession values and aggregate them with respect to each individual player and team. The system may perform such operations for different categories of play (e.g., passes, crosses, set plays, and the like) to provide a more detailed description of how a player may contribute to their team's attacking play.

Additionally, although the present discussion may focus on the sport of soccer, those skilled in the art understand that the present techniques can be extended to other sports, such as, but not limited to, basketball, rugby, hockey, tennis, baseball, football, and the like.

Figure 1:
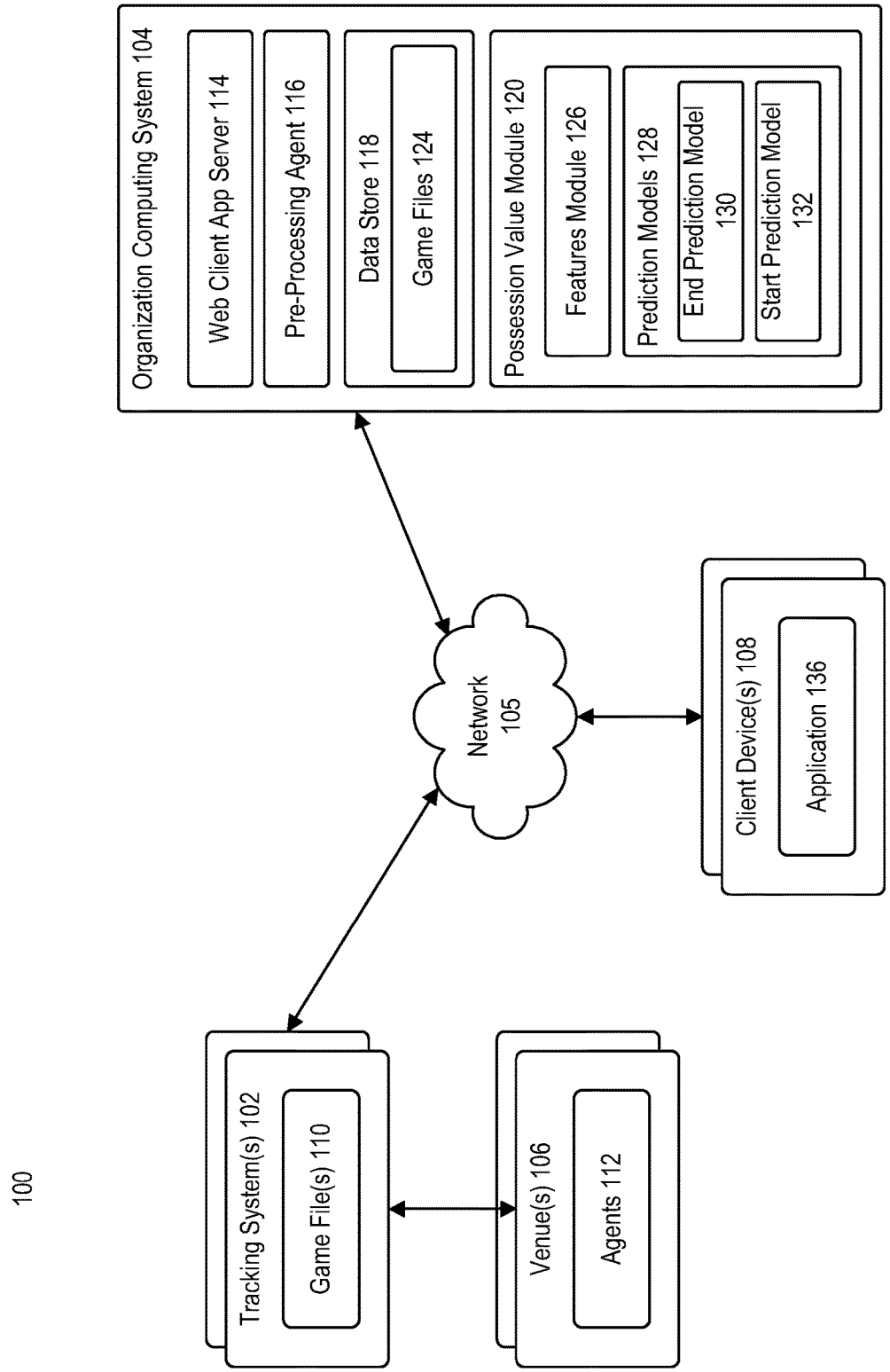
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN.

Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.). In some embodiments, tracking system 102 may be used for a broadcast feed of a given match. In such embodiments, each frame of the broadcast feed may be stored in a game file 110.

In some embodiments, game file 110 may further be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing agent 116, a data store 118, and a possession value module 120. Each of pre-processing agent 116 and possession value module 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include video data of a given match. For example, the video data may correspond to a plurality of video frames captured by tracking system 102. In some embodiments, the video data may correspond to broadcast data of a given match, in which case, the video data may correspond to a plurality of video frames of the broadcast feed of a given match. In some embodiments, one or more game files 124 may utilize "event data." Event data may correspond to data from a game or event that is annotated by an operator. The annotations may describe an event occurring in a current frame of the game or event. In some embodiments, event data may be automatically generated by tracking system 102 or pre-processing agent 116. For example, tracking system 102 or pre-processing agent 116 may be configured to analyze video data of a given match and automatically generate event data based on the video data.

In some embodiments, each game file 124 may correspond to a respective game file 110. For example, each game file 124 may be augmented with event information corresponding to event data, such as, but not limited to, game event information (pass, made shot, turnover, etc.) and context information (current score, time remaining, etc.).

Pre-processing agent 116 may be configured to process data retrieved from data store 118. For example, pre-processing agent 116 may be configured to generate one or more training data sets for training a prediction model (e.g., predictions model 128) used by possession value module 120. In some embodiments, pre-processing agent 116 may pre-process post-game data for training prediction models 128 of possession value module 120. Pre-processing agent 116 may filter out all non-ball touching events (e.g., aerial duels, out of bounds, substitutions, etc.). Pre-processing agent 116 may retain foul events to more easily approximate the sequence of events within and between possessions. In some embodiments, pre-processing agent 116 may filter out control events from the ball-touching event data. Control events may include non-pass and non-shot ball touches during a player possession. An exemplary control event may include a player changing direction during a ball carry. In some embodiments, control events may not be collected live.

Possession value module 120 may be configured to generate a possession value for an event based on event data. For example, as tracking system 102 or a human annotator tracks and records events to be submitted to organization computing system 104 in real-time, or near real-time, possession value module 120 may analyze the event and generate a possession value for the event in real-time or near real-time. In some embodiments, an event may refer to an on-ball event. Exemplary on-ball events may include, but are not limited to, a pass, a throw-in, a corner kick, a free-kick, a cross, a headed-pass, an off-side pass, a take-on, being fouled, a tackle, an interception, a clearance, an aerial, a ball recovery, bad ball handling, a 50/50 ball, a blocked pass, a rebound, a turnover, a screen, and the like.

Possession value module 120 may include a features module 126 and prediction models 128. Features module 126 may be configured to generate one or more features based on the event data. For example, upon receiving an indication of an event, possession value module 120 may receive various information about the event. Various information about the event may include, but is not limited to, one or more of: (x, y) coordinates of each player on the field during the event, which team has possession, (x, y) coordinates of the ball, the current score, the current time left, identification of players on the field during the event, role information about the event, and the like.

Using the data about the event, features module 126 may be configured to generate or derive features about the event. Exemplary features may include, but are not limited to, one or more of: an outcome of the event (i.e., was the event successful), a location of the event (e.g., (x, y) coordinates of the event), information regarding whether the event is performed as a cross, information regarding whether the event is performed as a header, information whether the event is performed as a free kick, information whether the event is performed as a corner kick, information about whether the event is performed as a penalty kick, information about whether the event is performed as a throw-in, end location of an event (e.g., end (x, y) coordinates), distances to the goal from the event location, a distance to the goal from the start and end locations of the event, an angle to the goal from the event location, an angle to the goal from a start of the event, an angle to the goal from an end of the event, a distance between a start location of the event and an end location of the event, a total distance of the event, an event type ID, a distance covered in an x-direction with respect to a previous event, a distance covered in a y-direction with respect to the previous event, a total distance covered with respect to the previous event, total speed and direction speed of the event with respect to the previous event, and the like.

Based on the event information and the generated or derived features of the event, possession value module 120 may generate a possession value for the event using prediction models 128. For example, prediction models 128 may be trained to predict how likely an event will be followed by a goal within the next x-seconds (e.g., next 10 seconds) after the event. In some embodiments, prediction models 128 may be representative of a random forest classifier trained to generate this prediction. In some embodiments, the output from prediction models 128 may be a probability in the range of [0,1].

To train prediction models 128, pre-processing agent 116 may generate a training data set based on game files 124. For example, pre-processing agent 116 may generate a training data set using game files 124 corresponding to on-ball events from a plurality of league seasons (e.g., 10 league seasons) across a plurality of leagues (e.g., English Premier League, Serie A, Eredivisie, German Bundesliga, La Liga, Ligue 1, Eredivisie, etc.). Using this data, prediction models 128 may learn to generate a possession value for each event.

In some embodiments, prediction models 128 may include an end prediction model 130 and a start prediction model 132. End prediction model 130 may be trained to predict the likelihood of one's own team scoring within the next X-seconds (e.g., next 10 seconds) of various events. Exemplary events may include, but are not limited to, passes (including offside passes), take-ons, free kicks and penalties won and conceded, tackles, ball recoveries, dispossession, and ball touch. In some embodiments, the events that may trigger a prediction from prediction models 128 may include a shot. For example, the likelihood of a shot resulting in a goal in the next X-seconds may always be equal to or higher than the likelihood of scoring from the shot itself, i.e., the shot itself plus potential rebounds, own goals, set pieces, won, etc. A shot could be used to identify more indirect positive of negative effects of shooting. For example, an off-target shot is technically a possession loss and might be a very undesirable action when in a possession where it is better to pass than score. In another example, a shot from distance in a crowded box may be more threatening in terms of winning a corner via a save or deflection than the threat of the shot itself.

For example, end prediction model 130 may generate a plurality of decision trees that aid in generating a possession value for each event. In this manner, end prediction model 130 may be trained or optimized to generate a possession value for real-time or near real-time events. For example, a random forest classifier may be fitted using a variety of features that may include, but are not limited to, event_type_id (e.g., one-hot encoded), is_cross, is_headed, is_free-kick, is_corner, is_throwin, is_penalty, is_goalkick, is_thruball, controlled_comp, next_headed, location_xg, outcome, distance_to_goal_pos, distance_to_goal_pos_end, angle_to_goal_pos, angle_to_goal_pos_end, x_distance_of_event, total_distance_of_event, distance_covered_x, distance_covered_y, distance_covered, speed_x, speed_y, speed, pos_xn, pos_yn, pos_end_xn, pos_end_yn.

Start prediction model 132 may be configured to generate a possession value start prediction. Generally, start prediction model 132 may be used in those situations where it does not make sense to use end prediction model 130. Using a specific example, start prediction model 132 may be used for open-play turnovers, as it was the opposition team that was in possession in the previous event.

Start prediction model 132 may include a suite of prediction models, each trained for a specific prediction type. For example, start prediction model 132 may include an open-play turnover possession value prediction model. The open-play turnover possession value prediction model may utilize logistic regression techniques. Start prediction model 132 may further include a free kick possession value prediction model. The free kick possession value prediction model may utilize logistic regression techniques. Start prediction model 132 may further include a throw-in possession value prediction model. The throw-in possession value prediction model may utilize logistic regression techniques. Start prediction model 132 may further include a corner kick possession value model. Corner kick possession value model may generate a corner kick prediction using the mean possession value of all corner kicks. Start prediction model 132 may further include a goal kick possession value model. Goal kick possession value model may generate a goal kick prediction using the mean possession value of all goal kicks. Start prediction model 132 may further include a penalty conceded possession value opponent danger prediction model. Penalty conceded possession value opponent danger prediction model may generate the possession value prediction using the mean expected goals of all penalties.

In some embodiments, in order to quantify the effect or effects of any particular action on increasing or decreasing a team's likelihood of scoring in the next X-seconds, a PV Added ($PV_{added}$) metric may be used. The $PV_{added}$ metric may be representative of the possession value of the current event minus the possession value of the previous event, i.e., $PV_{added}=PV_{end}-PV_{start}$. An example is shown below in conjunction with Table 1.

TABLE 1

| t | Team ID | Player ID | $PV_{start}$ | $PV_{end}$ | $PV_{added}$ |
|---|---|---|---|---|---|
| 1 | 11 | 101 | 0.01 | 0.02 | 0.01 |
| 2 | 11 | 201 | 0.02 | 0.05 | 0.03 |
| 3 | 11 | 301 | 0.05 | 0.03 | -0.02 |

There are, however, several exceptions to generating the $PV_{added}$ metric as outlined below. For example, possession loss, free kicks drawn, free kicks conceded, set pieces drawn, set pieces conceded, regains, launched pass, and unsuccessful ball touch may be calculated differently.

For possession value, if an event results in a turnover of possession (e.g., the opposition team takes control of the ball in the next event, including if the ball goes out of play and restarts with a set piece), it may be classified as a possession loss.

In some embodiments, the event may be classified as a possession loss if the previous event was by the same player or a teammate (e.g., the team must currently have an established possession in order for a player to lose possession).

In some embodiments, the event may be classified as a possession loss if the previous event was not an aerial duel.

In some embodiments, the event may be classified as a possession loss if the current event is one of an incomplete pass (e.g., offside, throw-in, or foul throw-in), a take-on, a ball recovery, or a dispossession; a free kick or penalty conceded; or an own goal In some embodiments, the event may be classified as a possession loss if the current event is not an aerial duel.

In some embodiments, the event may be classified as a possession loss if the next event to touch the ball (e.g., discounting non-ball touching events such as aerial duels, out of bounds, substitutions, etc.) is by the opposition team.

In some embodiments, the event may be classified as a possession loss if the next event to touch the ball is one of a pass, a take-on, a shot, a ball recovery, or a controlled claim by the goalkeeper. This may include all set pieces taken after the ball has gone out of play.

If the event is classified as a possession loss, the player responsible for the action may be penalized with a negative PV added score equal to the possession value start value, i.e., $PV_{added}=PV_{end}-PV_{start}$, where $PV_{end}=0$). In some embodiments, the possession loss value may be capped at a maximum level to prevent excessive negative scores (e.g., losing the ball in the opposition penalty area can easily have a larger negative value than playing a killer pass into the opposition penalty area has a positive value).

Table 2 below illustrates an example showing the effect of possession loss on $PV_{added}$. As shown, player_id=101 has an incompleted pass which is recovered by an opposition player. player_id=101 may be penalized with losing the value of the entire possession, i.e., $PV_{added}=-PV_{start}=-0.02$). Opposition player_id=499 may be rewarded with a $PV_{added}$ score and/or a $PV_{opponent\ danger}$ score for regaining possession; but their $PV_{added}$ score may be based on the end result of the action (i.e., the pass, not the recovery), where $PV_{start}=0$, i.e., the likelihood of their team scoring in the next X-seconds before they regained possession was zero.

TABLE 2

| t | Team ID | Player ID | Event Type ID | Outcome | Possession Loss | $PV_{start}$ | $PV_{end}$ | $PV_{added}$ |
|---|---|---|---|---|---|---|---|---|
| 1 | 11 | 101 | 1 | 0 | 1 | 0.02 | 0 | -0.02 |
| 2 | 22 | 499 | 1 | 1 | 0 | 0 | 0.06 | 0.06 |

In some embodiments, if a player is associated with a free kick or penalty won event, that player may be rewarded with a $PV_{start}$ of the resultant set piece. This value may be adjusted by subtracting the $PV_{end}$ value of the previous event if the player's team were in possession of the ball. Such functionality may be used to reduce bias favoring more attacking players who tend to control the ball in more advanced positions, where the possession value of set-pieces won may be higher.

Table 3, illustrated below, shows an of the effect of winning a free kick on $PV_{added}$. For example, as shown, player_id=499 may win a free kick, which may result in a higher likelihood of their team scoring ($PV_{end}=PV_{start\ of\ the\ resultant\ free\ kick}=0.09$) than did the previously completed pass ($PV_{start}=PV_{end\ of\ previous\ pass}=0.04$), resulting in a positive $PV_{added}=0.05$.

TABLE 3

| t | Team ID | Player ID | Event Type ID | Outcome | Set Piece | $PV_{start}$ | $PV_{end}$ | $PV_{added}$ |
|---|---|---|---|---|---|---|---|---|
| 10 | 11 | 101 | 1 | 1 | 0 | 0.02 | 0.04 | 0.02 |
| 11 | 22 | 499 | 4 | 1 | 0 | 0.04 | 0.09 | 0.05 |
| 30 | 22 | 599 | 1 | 1 | 1 | 0.09 | 0.02 | −0.07 |

In some embodiments, the event corresponding to the adjusted value may be negative (i.e., the $PV_{start}$ of the following set piece may be lower than the $PV_{end}$ of the previous event), which may result in $PV_{added}$ being capped at zero (i.e., a player can never be penalised for being fouled).

Table 4, as shown below, illustrates another example of winning a free kick, which instead reduces the likelihood of the team scoring. As shown, player_id=623 may win a free kick which has a lower likelihood of their team scoring in the next X-seconds ($PV_{end}=PV_{start\ of\ resultant\ free\ kick}=0.04$) than did the previously completed pass ($PV_{start}=PV_{end\ of\ previous\ pass}=0.08$), resulting in a negative $PV_{added}=-0.04$, which is capped at zero.

TABLE 4

| t | Team ID | Player ID | Event Type ID | Outcome | Set Piece | $PV_{start}$ | $PV_{end}$ | $PV_{added}$ |
|---|---|---|---|---|---|---|---|---|
| 40 | 11 | 101 | 1 | 1 | 0 | 0.02 | 0.08 | 0.06 |
| 41 | 22 | 623 | 4 | 1 | 0 | 0.08 | 0.04 | 0 |
| 60 | 22 | 599 | 1 | 1 | 1 | 0.04 | 0.03 | −0.01 |

In some embodiments, if a player concedes a free kick or penalty when their team currently holds an established possession, they may be penalized with a negative $PV_{added}$ score equal to the $PV_{start}$ of the previous action. In some embodiments, there may also be a PV Opponent Danger ($PV_{OD}$) score associated therewith.

In some embodiments, similar to winning free kicks, if a player is regarded as winning a set piece by forcing an opposition player to put the ball out of bounds (e.g., a cross into the box which is headed out for a corner), they may be rewarded with a $PV_{added}$ value equal to the $PV_{start}$ of the resultant set piece. This value may be added to the $PV_{added}$ value of the current event.

Table 5, illustrated below, shows an example of the effect of winning a set piece on $PV_{added}$. For example, as shown, a pass by player_id=101 may be intercepted by an opposition player and goes out for a corner. Although the incomplete pass by player_id=101 may be regarded as having a negative effect ($PV_{added}=PV_{end}-PV_{start}=0.01-0.02=-0.01$), winning the corner may have a positive effect ($PV_{start}=0.03$) and this may be added to the $PV_{added}$ score ($PV_{added}=-0.01+0.03=0.02$). Note, the value of winning the set piece may not be duplicated as player_id=201 may only be scored on taking the corner, not on winning it.

TABLE 5

| t | Team ID | Player ID | Event Type ID | Outcome | Set piece | $PV_{start}$ | $PV_{end}$ | $PV_{added}$ |
|---|---|---|---|---|---|---|---|---|
| 10 | 11 | 101 | 1 | 0 | 0 | 0.02 | 0.01 | −0.01 |
| 11 | 22 | 499 | 8 | 0 | 0 | 0 | 0 | 0 |
| 30 | 11 | 201 | 1 | 1 | 1 | 0.03 | 0.08 | 0.05 |

In some embodiments, an event may be classified as winning a set piece if the next, next event to touch the ball is a corner, throw-in, or goal kick (e.g., shot-<clearance-<corner).

In some embodiments, an event may be classified as winning a set piece if the next event to touch the ball is by the opposition team.

In some embodiments, an event may be classified as winning a set piece if the next event to touch the ball occurs within Y-seconds (e.g., 2 seconds) of the current event (this threshold may be chosen to yield more true positives like a cross into the box being headed out by a defender for a corner, and fewer false positives like an unpressured pass being accidentally played out of bounds after a turnover).

In some embodiments, an event may be classified as winning a set piece if the current event is one of a pass, a take-one, a tackle, a shot, a ball recovery; a free kick or penalty conceded; or an own goal.

In some embodiments, an event may be classified as winning a set piece if the current event is not an aerial duel.

In some embodiments, although shots may not have a $PV_{added}$ score directly associated with them (this is instead covered by xG), shots which result in a set piece drawn may have a $PV_{added}$ value.

In some embodiments, similar to conceding free kicks, if a player is regarded as conceding a set piece by putting the ball out of bounds when their team currently hold an established possession, they may be penalized with a negative $PV_{added}$ score equal to the $PV_{start}$ of the previous action. In some embodiments, such events may also have a $PV_{OD}$ score associated therewith.

In some embodiments, in the live event data, recovering possession may be demonstrated explicitly with regain-associated events (e.g., ball recovery, goalkeeper claim, etc.) or implicitly from other events (e.g., a pass immediately following an incomplete opposition pass). Although prediction models 128 could predict a $PV_{start}$ value at the location of the regain (e.g., using an open-play turnover model described above), prediction models 128 may set the $PV_{start}$ of a regain event at zero and thus $PV_{added}=PV_{end}-0$ (i.e., the likelihood of the player's team scoring in the next X-seconds before they regained possession was zero, so they may be rewarded with the full end possession value of their action). In some embodiments, such technique may introduce a bias which may favor higher $PV_{added}$ scores for players who play in more offensive positions (e.g., forwards regaining possession near the opposition box are more likely to make actions with very high $PV_{end}$ values compared to defenders regaining possession near their own box).

Table 6, shown below, illustrates an example of the effect of a regain on $PV_{OD}$. As shown, player_id=499 regains the ball and is rewarded with a $PV_{OD}$ score equal to the $PV_{end}$ of their action ($PV_{added}=PV_{end}-PV_{start}=0.06-0=0.06$). In some embodiments, player_id=499 may also be rewarded with a $PV_{OD}$ score for regaining possession.

Table 6, shown below, illustrates an example of the effect of a regain on $PV_{OD}$. As shown, player_id=499 regains the ball and is rewarded with a $PV_{OD}$ score equal to the $PV_{end}$ of their action ($PV_{added} = PV_{end} - PV_{start} = 0.06 - 0 = 0.06$). In some embodiments, player_id=499 may also be rewarded with a $PV_{OD}$ score for regaining possession.

TABLE 6

| t | Team ID | Player ID | Event Type ID | Outcome | Possession loss | $PV_{start}$ | $PV_{end}$ | $PV_{added}$ |
|---|---|---|---|---|---|---|---|---|
| 1 | 11 | 101 | 1 | 0 | 1 | 0.02 | 0 | -0.02 |
| 2 | 22 | 499 | 1 | 1 | 0 | 0 | 0.06 | 0.06 |

In some embodiments, a launched pass may always have a zero $PV_{added}$ value whether it is controlled by a teammate or not.

In some embodiments, an unsuccessful ball touch may always has a zero $PV_{added}$ value.

In some embodiments, while possession value module 120 may not explicitly model the likelihood of the opposition team scoring (e.g., "Opposition PV") in the next X-seconds for each action (e.g., a backpass to one's own goalkeeper is an action that would decrease (own team) PV while simultaneously increasing Opposition PV), possession value module 120 may be configured to infer Opposition PV for possession loss events by taking the $PV_{start}$ of the following action by the opposition (i.e., the PV of team B when regaining possession=the Opposition PV of team A when losing possession).

Similar to how $PV_{added}$ may be defined to quantify the effect of an action on increasing or decreasing one's own team's likelihood of scoring, $PV_{OD}$ may be used to quantify the effect of an action on increasing or decreasing the opposition team's likelihood of scoring. $PV_{OD}$ may be generated in a variety of different ways for various action types, as discussed below.

In some embodiments, if the event is classified as a possession loss, the player responsible for the action may be penalized with a $PV_{OD}$ score equal to the $PV_{start}$ value of the immediately following opposition action, i.e., $PV_{OD} = PV_{end} - \text{Next } PV_{start}$, where $PV_{end} = 0$). The $PV_{start}$ of the following action may be generated by one of the $PV_{start}$ models (discussed above) whether the ball is turned over in open-play or via a set piece.

Table 7, as shown below, illustrates an example of the effect of possession loss on $PV_{OD}$. In some embodiments, the open-play turnover model may predict the opponent $PV_{start}$ value of 0.04 (i.e., the likelihood of the opposition scoring in the next X-seconds from the turnover location), forming the $PV_{OD}$ value of 0.04. In some embodiments, while the opponent $PV_{start}$ value is non-zero for the event immediately following the possession loss, the $PV_{start}$ value is zero.

TABLE 7

| t | Team ID | Player ID | possession loss | $PV_{start}$ | $PV_{end}$ | $PV_{added}$ | Opponent $PV_{start}$ | $PV_{OD}$ |
|---|---|---|---|---|---|---|---|---|
| 1 | 11 | 101 | 1 | 0.02 | 0 | -0.02 | — | — |
| 2 | 22 | 499 | 0 | 0 | 0.06 | 0.06 | 0.04 | 0.04 |

In some embodiments, if a player concedes a free kick or penalty, they may be penalized with a $PV_{OD}$ score equal to the $PV_{start}$ of the resultant set piece. This value may be adjusted by subtracting the $PV_{end}$ of the previous event if the opposition team were in possession of the ball. Such process may be performed to account for tactical fouls, in which conceding a free kick may reduce the opposition team likelihood of scoring in the next X-seconds (e.g., breaking up a dangerous counterattack) and negative $PV_{OD}$ values are therefore possible.

Table 8, as shown below, illustrates an example of the effect of conceding a free kick on $PV_{OD}$ (i.e., the same example as in Table 4 above). As shown, player_id=623 may concede a free kick ($PV_{end}$ of resultant free kick=Opponent $PV_{start}$=0.04) which may have a lower likelihood of the opposition scoring from than the previous event ($PV_{end}$ of previous event=0.08), resulting in player_id=623 being rewarded with a negative $PV_{OD}$ score (0.04-0.08=-0.04) (i.e., they reduced the opposition goalscoring threat through conceding a foul).

TABLE 8

| t | Team ID | Player ID | Event Type ID | Outcome | Set piece | $PV_{start}$ | $PV_{end}$ | $PV_{added}$ | Opponent $PV_{start}$ | $PV_{OD}$ |
|---|---|---|---|---|---|---|---|---|---|---|
| 40 | 11 | 101 | 1 | 1 | 0 | 0.02 | 0.08 | 0.06 | — | — |
| 41 | 22 | 623 | 4 | 0 | 0 | 0.08 | 0.04 | 0 | 0.04 | -0.04 |
| 60 | 22 | 599 | 1 | 1 | 1 | 0.04 | 0.03 | -0.01 | — | — |

In some embodiments, similar to conceding free kicks, if a player is regarded as conceding a set piece by putting the ball out of bounds, they may be penalized with a $PV_{OD}$ score equal to the $PV_{start}$ of the resultant set piece. This value may be adjusted by subtracting the $PV_{end}$ of the previous event if the opposition team were in possession of the ball. In some embodiments, as for free kicks conceded, negative $PV_{OD}$ values may therefore possible if opposition goalscoring threat is reduced.

Table 9, as shown below, illustrates an example of the effect of conceding a set piece on $PV_{OD}$. As shown, player_id=499 may put the ball out of bounds with an interception ($PV_{start}$ of resultant corner=Opponent $PV_{start}$=0.03), which may have a higher likelihood of the opposition scoring from than the previous event ($PV_{end}$ of previous event=0.01), resulting in player_id=499 being penalized with a positive $PV_{OD}$ score (0.03-0.01=0.02) (i.e. they increased the opposition goalscoring threat through conceding a set piece).

TABLE 9

| t | Team ID | Player ID | Event Type ID | Outcome | Set piece | $PV_{start}$ | $PV_{end}$ | $PV_{added}$ | Opponent $PV_{start}$ | $PV_{OD}$ |
|---|---|---|---|---|---|---|---|---|---|---|
| 10 | 11 | 101 | 1 | 0 | 0 | 0.02 | 0.01 | −0.01 | — | — |
| 11 | 22 | 499 | 8 | 0 | 0 | 0 | 0 | 0 | 0.03 | 0.02 |
| 30 | 11 | 201 | 1 | 1 | 1 | 0.03 | 0.08 | 0.05 | — | — |

In some embodiments, if a player concedes an own goal, they may be penalized with a $PV_{OD}$ score of 1.00, i.e., they raised the likelihood of the opponent scoring to 100%. This value may be adjusted by subtracting the $PV_{end}$ of the previous event if the opposition team were in possession of the ball. Accordingly, more threatening passes, which already presented a high degree of danger, may be penalized less harshly.

Table 10, as shown below, illustrates an example of the effect of scoring an own goal on $PV_{OD}$. As shown, player_id=577 may score an own goal, which is heavily penalised (Opponent $PV_{start}$=1.00) although somewhat mediated by the value of the previous opposition action ($PV_{OD}$=Opponent $PV_{start}$−$PV_{end}$ of previous action=1.00−0.09=0.91).

TABLE 10

| t | Team ID | Player ID | Event Type ID | Own Goal | $PV_{start}$ | $PV_{end}$ | $PV_{added}$ | Opponent $PV_{start}$ | $PV_{OD}$ |
|---|---|---|---|---|---|---|---|---|---|
| 10 | 11 | 201 | 1 | 0 | 0.04 | 0.09 | 0.05 | — | — |
| 12 | 22 | 577 | 16 | 1 | 0 | 0 | 0 | 1.00 | 0.91 |

In some embodiments, in the same way as a possession loss may be negatively penalized with the negative value of one's own team's latest PV (i.e., the likelihood of scoring in the next X-seconds drops to zero), a regain of possession from the opposition (i.e., an opposition possession loss) may be rewarded with a $PV_{OD}$ score equal to the negative value of the opposition team's last $PV_{start}$ value (i.e., the likelihood of the opposition team scoring in the next X-seconds drops to zero). In some embodiments, the $PV_{end}$ value of the previous possession loss event may be zero and thus cannot be used to calculate $PV_{OD}$.

Table 11, as shown below, illustrates an example of the effect of a regain on $PV_{OD}$. As shown, player_id=499 may regain the ball and may be rewarded with a $PV_{OD}$ score equal to the negative of the last opposition PV ($PV_{OD}$=−$PV_{start}$ of previous event=−0.02). In some embodiments, player_id=499 may also rewarded with a PV Added score for regaining possession, as described above.

TABLE 11

| t | Team ID | Player ID | Possession Loss | $PV_{start}$ | $PV_{end}$ | $PV_{added}$ | $PV_{OD}$ |
|---|---|---|---|---|---|---|---|
| 1 | 11 | 101 | 1 | 0.02 | 0 | −0.02 | — |
| 2 | 22 | 499 | 0 | 0 | 0.06 | 0.06 | −0.02 |

In some embodiments, it may be possible for situations which are not classified as a possession loss for one team to be classified as a regain for the other team, and vice versa. For example, a misplaced pass going out of bounds may be regarded as a possession loss but the resultant set piece to restart play may not regarded as a regain; on the other hand, a ball recovery after a clearance by the opposition may be regarded as a regain but the clearance may not be regarded as a possession loss.

In some embodiments, possession value module 120 may implement a delay on the prediction. For example, in some embodiments, upon receiving an event from tracking system 102 or a human annotator, possession value module 120 may initiate a delay of one minute. The delay may allow possession value module 120 to account for any noise in the real-time or near real-time event data. During the delay, features module 126 may determine or generate those features to be used by prediction models 128 to generate a possession value for the event. The delay is minimal enough that the output from prediction models 128 may still be timely.

Possession value module 120 may utilize the various possession values for events across a game to generate metrics on a team level and a player level. For example, possession value module 120 may include a time triggered function that determines a momentum value for each team per minute of a game. In some embodiments, possession value module 120 may utilize two types of aggregations. For example, possession value module 120 may first determine a maximum possession value metric per minute for both teams. These possession value metrics may describe an attacking threat of a respective team. The difference per minute between the attacking threat values of the teams may correspond to the momentum value. Such momentum value may signal which team is closer to scoring a goal.

In some embodiments, possession value module 120 may include a second time triggered function that generates possession value aggregations for all players and teams. For example, possession value module 120 may include logic that allows possession value module 120 to aggregate possession value metrics for each player and team in different categories. Exemplary categories may include, but are not limited to, successful passes, unsuccessful passes, losing ball possession, gaining ball possession, and the like. In this manner, possession value module 120 may provide end users with more granular data regarding a player's individual metrics and a team's metrics for various categories.

For example, $PV_{added}$ scores may be aggregated at the player-level in several different ways in order to yield a metric which proxies a player's attacking quality by quantifying their positive or negative influence on their team's probability of scoring over some period of time (e.g. over a single game, over a single season, over their entire career). The absolute values of these aggregations can be useful if they correlate with the actual number of team goals scored over a large enough sample size, although relative rankings of players may be equally useful and possibly more intuitive (e.g., "Kevin de Bruyne is ranked #1 for attacking threat across the Premier League this season"; "in this game, Trent Alexander-Arnold contributed the $2^{nd}$ most attacking threat within a single game of any player in the Premier League this season").

In some embodiments, $PV_{added}$ can also be aggregated at the team-level. For example, if a team had a long possession which contained many threatening passes (e.g., 12 passes each with $PV_{added}$=0.1), the summed $PV_{added}$ across the possession could become greater than 1 (e.g. 1.2), which is not sensical as there can only be a maximum of one goal in any given possession.

There may be several ways to aggregate $PV_{added}$ at the player-level. In some embodiments, possession value module 120 may simply take the $PV_{added}$ value, which may include all positive and negative actions, and yield a positive or negative score. In some embodiments, possession value module 120 may focus on only progressive (e.g., positive $PV_{added}$) or regressive (e.g., negative $PV_{added}$), depending on whether an end user is more interested in focusing on the positive or negative aspects of a player's attacking game (e.g., an end user might not care about the crosses Alexander Alexander-Arnold does not complete, only the goalscoring threat of the crosses he does complete). In some embodiments, possession value module 120 can also aggregate $PV_{added}$ by event type to focus on specific actions. For example, to identify the best ball carriers, possession value module 120 may look at $PV_{added}$ from take-ons and/or free kicks drawn. In another example, to identify the best players involved in turnovers, possession value module 120 may look at $PV_{added}$ from regains.

Some exemplary aggregations categories include $PV_{added}$ from one or more of: open-play (all actions; +/−), passes (+/−), crosses (+/−), set pieces taken (+/−), free kicks drawn (+), free kicks conceded (+/−), set pieces drawn (+/−), set pieces conceded (+/−), own goals scored (−), possession loss (−), take-ons (+/−), tackles (+), regains (+). Any of the metrics with a (+/−) can be further split into separate progressive and regressive categories (e.g., PV Progressive from passes).

In some embodiments, there are one or more ways in which possession value module 120 may combine some of these aggregations to yield a single holistic metric to describe player offensive quality, such as $PV_{added}$ from open-play+$PV_{added}$ from set pieces taken.

In some embodiments, possession value module 120 may also include $PV_{added}$ from free kicks drawn/conceded, set pieces drawn/conceded, and/or own goals conceded. Although these values can be very large compared to other aggregates, thus resulting in less intuitive player scores and rankings (e.g., winning a penalty can be as high as $PV_{added}$=0.78, whereas an elite player's $PV_{added}$ through open-play passes is often less than this over the course of an entire game).

As those skilled in the art recognize, possession value module 120 may also aggregate $PV_{OD}$ scores in a similar manner to describe a player's positive or negative influence on the opposition team's likelihood of scoring.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 136. Application 136 may be representative of a web browser that allows access to a website or a stand-alone application. Client device 108 may use access application 136 to access one or more functionalities of organization computing system 104. Client device 108 may communicate over network 105 to request a webpage, for example, from web client application server 114 of organization computing system 104. For example, client device 108 may be configured to execute application 136 to access content managed by web client application server 114. The content that is displayed to client device 108 may be transmitted from web client application server 114 to client device 108, and subsequently processed by application 136 for display through a graphical user interface (GUI) of client device 108.

Figure 2:
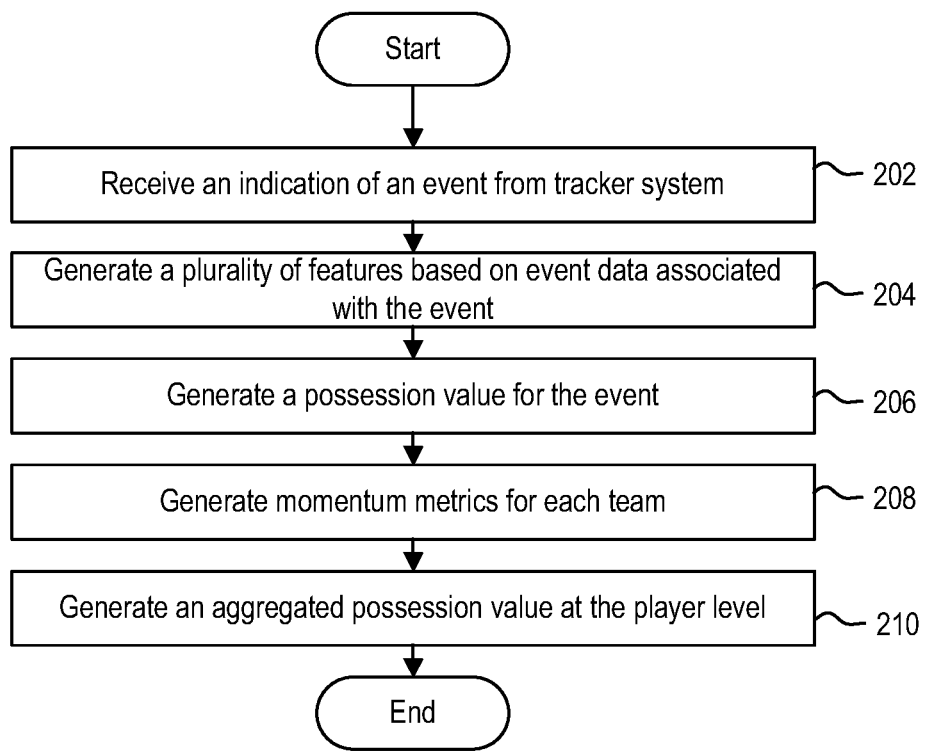
FIG. 2 is a flow diagram illustrating a method of generating a possession value metric for an event, according to example embodiments.

FIG. 2 is a flow diagram illustrating a method 200 of generating a possession value metric for an event, according to example embodiments. Method 200 may begin at step 202.

At step 202, organization computing system 104 may receive an indication of an event. In some embodiments, organization computing system 104 may receive the indication of the event from a human annotator watching the event. In some embodiments, organization computing system 104 may receive an indication of an event automatically from tracking system 102 or pre-processing agent 116. In some embodiments, the indication may be received in real-time or near real-time. In some embodiments, the event may correspond to an on-ball event. Exemplary on-ball events may include, but are not limited to, a pass, a throw-in, a corner kick, a free-kick, a cross, a headed-pass, an off-side pass, a take-on, being fouled, a tackle, an interception, a clearance, an aerial, a ball recovery, bad ball handling, a 50/50 ball, a blocked pass, a rebound, a turnover, a screen, and the like.

In some embodiments, the indication of the event may include various data associated therewith. For example, various data about the event may include, but is not limited to, one or more of: (x, y) coordinates of each player on the field during the event, which team has possession, (x, y) coordinates of the ball, the current score, the current time left, identification of players on the field during the event, role information about the event, and the like.

At step 204, organization computing system 104 may generate a plurality of features based on the data associated with the event. For example, features module 126 may be configured to generate or derive features about the event. Exemplary features may include, but are not limited to, one or more of: an outcome of the event (i.e., was the event successful), a location of the event (e.g., (x, y) coordinates of the event), information regarding whether the event is performed as a cross, information regarding whether the event is performed as a header, information whether the event is performed as a free kick, information whether the event is performed as a corner kick, information about whether the event is performed as a penalty kick, information about whether the event is performed as a throw-in, end location of an event (e.g., end (x, y) coordinates), distances to the goal from the event location, a distance to the goal from the start and end locations of the event, an angle to the goal from the event location, an angle to the goal from a start of the event, an angle to the goal from an end of the event, a distance between a start location of the event and an end location of the event, a total distance of the event, an event type ID, a distance covered in an x-direction with respect to a previous event, a distance covered in a y-direction with respect to the previous event, a total distance covered with respect to the previous event, total speed and direction speed of the event with respect to the previous event, and the like.

At step 206, organization computing system 104 may generate a possession value metric for the event based on the event data and the plurality of features. A possession value metric may correspond to a probability that the event will be followed by a goal within the next x-seconds (e.g., next 10 seconds) after the event. In some embodiments, the possession value metric may take the form of a value between [0,1]. To generate the possession value metric, prediction models 128 may receive, as input, the event data and the plurality of features. As output, prediction models 128 may generate a numerical representation of the probability of a goal occurring within the next x-seconds.

In some embodiments, method 200 may include step 208. At step 208, organization computing system 104 may aggregate possession value metrics generated for each event in the game to generate a momentum metric for each team. For example, every time an event occurs within the game, organization computing system 104 may receive an indication of the event, which may, in turn, generate a possession value metric for each event. To generate the momentum metric, possession value module 120 may first determine a maximum possession value metric per minute for both teams. These possession value metrics may describe an attacking threat of a respective team. The difference per minute between the attacking threat values of the teams may correspond to the momentum metric.

In some embodiments, method 200 may include step 210. At step 210, organization computing system 104 may generate an aggregated possession value at the player level. For example, possession value module 120 may generate an aggregate possession value for one or more categories for each player. Exemplary categories may include, but are not limited to, successful passes, unsuccessful passes, losing ball possession, gaining ball possession, and the like. In this manner, possession value module 120 may provide end users with more granular data regarding a player's individual metrics and a team's metrics for various categories. To do so, possession value module 120 may identify which player or players are involved in each event. In this manner, possession value module 120 may attribute a possession value for an event to an individual player. These metrics may be aggregated across a game or season to identify how a player may perform across a variety of categories. Such functionality may not be limited to players and can instead be extended to the team level. For example, possession value module 120 may perform a similar analysis for the team, as a whole, for each category of events.

Figure 3:
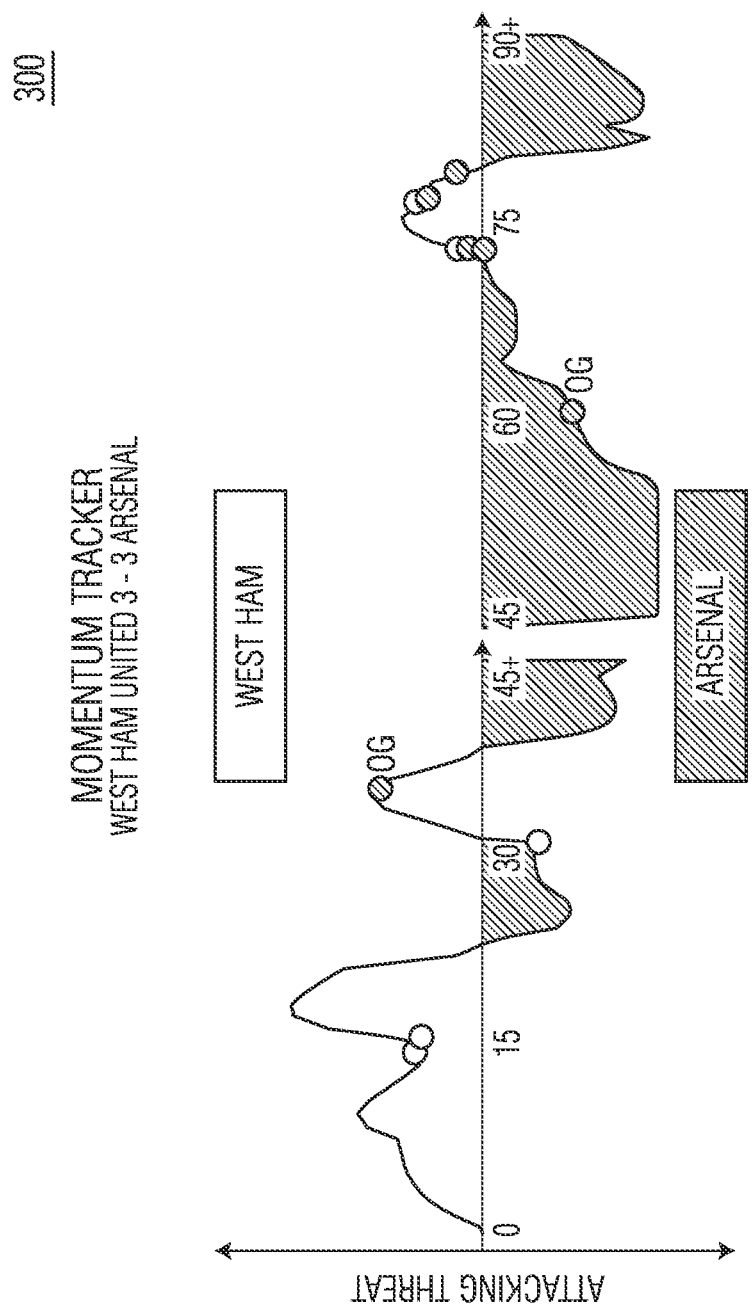
FIG. 3 illustrates an exemplary momentum plot, according to example embodiments.

FIG. 3 illustrates an exemplary momentum plot 300, according to example embodiments. As shown, momentum plot 300 may provide a visual representation of a likelihood that a team the team in possession will score a goal in the next x-seconds. In this manner, a team or user is able to easily see which team had the upper hand or advantage at each point of the game.

Figures 4A, 4B, 4C:
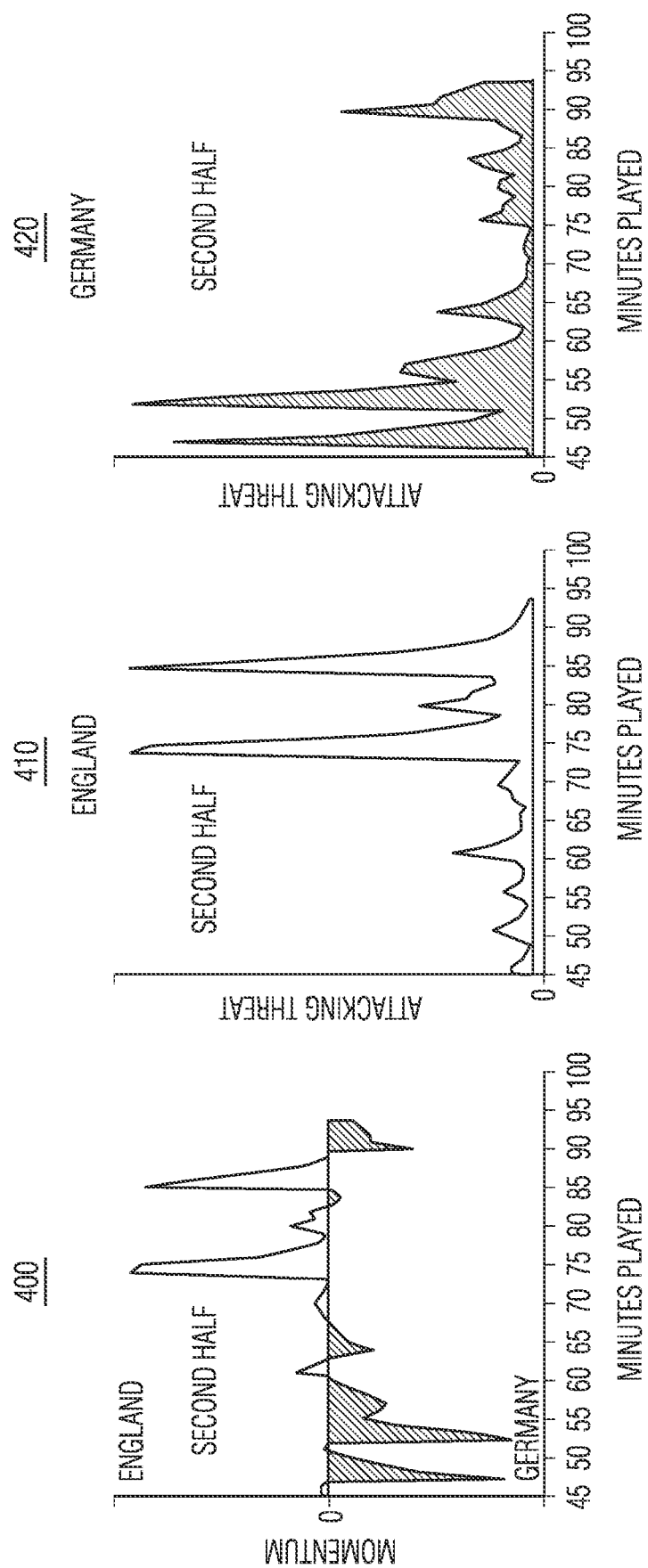
FIG. 4A illustrates a combined momentum plot, according to example embodiments.
FIG. 4B illustrates a first momentum plot for a first team, according to example embodiments.
FIG. 4C illustrates a second momentum plot for a second team, according to example embodiments.

FIG. 4A illustrates a combined momentum plot 400, according to example embodiments. As shown, combined momentum plot 400 may illustrate which team had momentum in the game at various points of the event. For example, as shown, combined momentum plot 400 may illustrate which team had momentum in the game in each minute of the game.

FIG. 4B illustrates a first momentum plot 410 for a first team, according to example embodiments. As shown, the first team and game may correspond to one of the teams involved in the game represented by combined momentum plot 400 in FIG. 4A. First momentum plot 410 may illustrate the first team's momentum at each minute of the game.

FIG. 4C illustrates a second momentum plot 420 for a second team, according to example embodiments. As shown, the second team and game may correspond to one of the teams involved in the game represented by combined momentum plot 400 in FIG. 4A. Second momentum plot 420 may illustrate the second team's momentum at each minute of the game.

Referring back to FIG. 4A, to generate combined momentum plot 400, possession value module 120 may subtract second momentum plot 420 from first momentum plot 410.

FIG. 5 illustrates a graphical representation 500 of individual player metrics, according to example embodiments. As shown, graphical representation 500 may provide an aggregated metric count for two categories: passes and crosses.

Figure 6A:
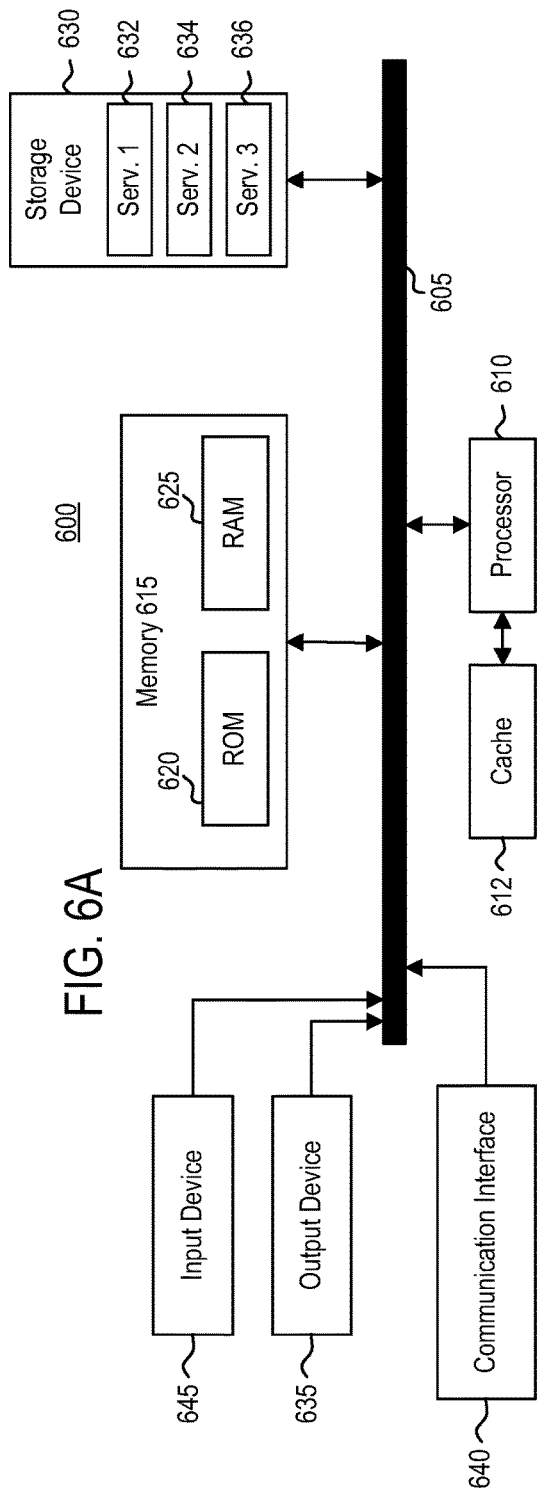
FIG. 6A is a block diagram illustrating a computing device, according to example embodiments.

FIG. 6A illustrates an architecture of computing system 600, according to example embodiments. System 600 may be representative of at least a portion of organization computing system 104. One or more components of system 600 may be in electrical communication with each other using a bus 605. System 600 may include a processing unit (CPU or processor) 610 and a system bus 605 that couples various system components including the system memory 615, such as read only memory (ROM) 620 and random access memory (RAM) 625, to processor 610. System 600 may include a cache of high-speed memory connected directly with, in close proximity to, or integrated as part of processor 610. System 600 may copy data from memory 615 and/or storage device 630 to cache 612 for quick access by processor 610. In this way, cache 612 may provide a performance boost that avoids processor 610 delays while waiting for data. These and other modules may control or be configured to control processor 610 to perform various actions. Other system memory 615 may be available for use as well. Memory 615 may include multiple different types of memory with different performance characteristics. Processor 610 may include any general purpose processor and a hardware module or software module, such as service 1 632, service 2 634, and service 3 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing system 600, an input device 645 may represent any number of input mechanisms, such as a microphone for speech, a touch-sensitive screen for gesture or graphical input, keyboard, mouse, motion input, speech and so forth. An output device 635 (e.g., display) may also be one or more of a number of output mechanisms known to those of skill in the art. In some instances, multimodal systems may enable a user to provide multiple types of input to communicate with computing system 600. Communications interface 640 may generally govern and manage the user input and system output. There is no restriction on operating on any particular hardware arrangement and therefore the basic features here may easily be substituted for improved hardware or firmware arrangements as they are developed.

Storage device 630 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 may include services 632, 634, and 636 for controlling the processor 610. Other hardware or software modules are contemplated. Storage device 630 may be connected to system bus 605. In one aspect, a hardware module that performs a particular function may include the software component stored in a computer-readable medium in connection with the necessary hardware components, such as processor 610, bus 605, output device 635, and so forth, to carry out the function.

Figure 6B:
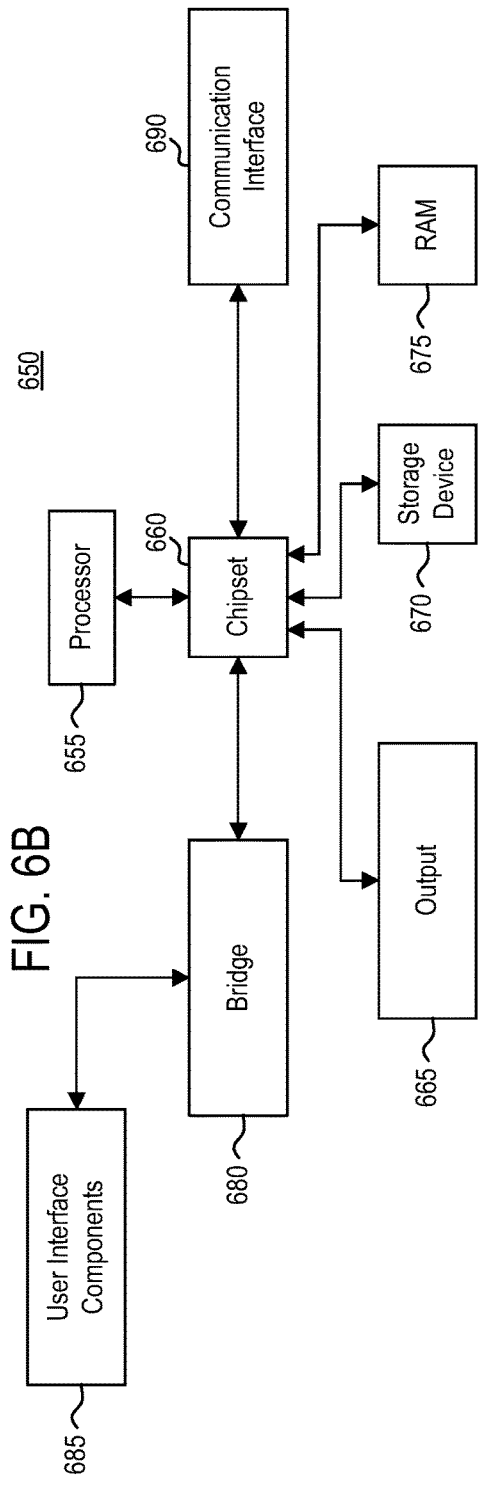
FIG. 6B is a block diagram illustrating a computing device, according to example embodiments.

FIG. 6B illustrates a computer system 650 having a chipset architecture that may represent at least a portion of organization computing system 104. Computer system 650 may be an example of computer hardware, software, and firmware that may be used to implement the disclosed technology. System 650 may include a processor 655, representative of any number of physically and/or logically distinct resources capable of executing software, firmware, and hardware configured to perform identified computations. Processor 655 may communicate with a chipset 660 that may control input to and output from processor 655. In this example, chipset 660 outputs information to output 665, such as a display, and may read and write information to storage device 670, which may include magnetic media, and solid-state media, for example. Chipset 660 may also read data from and write data to RAM 675. A bridge 680 for interfacing with a variety of user interface components 685 may be provided for interfacing with chipset 660. Such user interface components 685 may include a keyboard, a microphone, touch detection and processing circuitry, a pointing device, such as a mouse, and so on. In general, inputs to system 650 may come from any of a variety of sources, machine generated and/or human generated.

Chipset 660 may also interface with one or more communication interfaces 690 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 655 analyzing data stored in storage device 670 or RAM 675. Further, the machine may receive inputs from a user through user interface components 685 and execute appropriate functions, such as browsing functions by interpreting these inputs using processor 655.

It may be appreciated that example systems 600 and 650 may have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method comprising:
   receiving, by a computing system, one or more event indications corresponding to one or more events of a game from a tracking system, wherein each of the one or more event indications corresponds to an on-ball event, and wherein each of the one or more event indications include event data, and wherein the game includes one or more teams, and wherein the one or more teams include one or more players;
   generating, by the computing system, one or more features for each of the one or more events based on the corresponding event data;
   generating, by the computing system, via a prediction model, a possession value metric for each of the one or more events based on the event data and the one or more features, wherein the possession value metric includes a numerical representation corresponding to a likelihood that a possession team will score within a time period after the one or more events;
   aggregating, by the computing system, the possession value metric for each of the one or more events to generate a momentum metric for each of the one or more teams;
   generating, by the computing system, a visual representation corresponding to the momentum metric; and
   outputting, by the computing system, the visual representation to a display of a device.

2. The method of claim 1, the method further comprising:
   generating, by the computing system, an aggregate possession value for one or more categories for each of the one or more players.

3. The method of claim 2, wherein the one or more categories include one or more of: a successful pass category, an unsuccessful pass category, a losing ball possession category, or a gaining ball possession category.

4. The method of claim 1, the method further comprising:
   identifying, by the computing system, a target player of the one or more players on a first team of the one or more teams in at least one of the one or more events;

identifying, by the computing system, a subset of additional events that involve the target player;

generating, by the computing system, a subset of additional target possession values based on the subset of additional events; and generating, by the computing system, a plurality of metrics for the target player based on the subset of additional target possession values.

5. The method of claim 1, wherein generating, via the prediction model, the possession value metric for each of the one or more events based on the event data and the one or more features includes:

generating, by the computing system, via the prediction model, a plurality of decision trees; and analyzing, by the computing system, the plurality of decision trees to determine the possession value metric for each of the one or more events.

6. The method of claim 1, wherein the one or more features may include at least one of: an event outcome, an event location, event cross data, event header data, free kick event data, corner kick event data, penalty kick event data, throw-in event data, an event end location, goal distance data, goal angle data, goal location data, event distance data, an event type identifier, previous event distance data, total speed data, or event direction speed data.

7. The method of claim 1, wherein the on-ball event includes at least one of: a pass event, a throw-in event, a corner kick event, a free-kick event, a cross event, a headed-pass event, an off-side pass event, a take-on event, a foul event, a tackle event, an interception event, a clearance event, an aerial event, a ball recovery event, a bad ball handling event, a 50/50 ball event, a blocked pass event, a rebound event, a turnover event, or a screen event.

8. A system, comprising:
a processor; and
a memory having programming instructions stored thereon, which, when executed by the processor, causes the system to perform operations, comprising:

receiving one or more event indications corresponding to one or more events of a game from a tracking system, wherein each of the one or more event indications corresponds to an on-ball event, and wherein each of the one or more event indications include event data, and wherein the game includes one or more teams, and wherein the one or more teams include one or more players;

generating one or more features for each of the one or more events based on the corresponding event data;

generating, via a prediction model, a possession value metric for each of the one or more events based on the event data and the one or more features, wherein the possession value metric includes a numerical representation corresponding to a likelihood that a possession team will score within a time period after the one or more events;

aggregating the possession value metric for each of the one or more events to generate a momentum metric for each of the one or more teams;

generating a visual representation corresponding to the momentum metric; and outputting the visual representation to a display of a device.

9. The system of claim 8, wherein the operations further comprise:

generating an aggregate possession value for one or more categories for each of the one or more players.

10. The system of claim 9, wherein the one or more categories include one or more of: a successful pass category, an unsuccessful pass category, a losing ball possession category, or a gaining ball possession category.

11. The system of claim 8, wherein the operations further comprise:

identifying a target player of the one or more players on a first team of the one or more teams in at least one of the one or more events;

identifying a subset of additional events that involve the target player;

generating a subset of additional target possession values based on the subset of additional events; and generating a plurality of metrics for the target player based on the subset of additional target possession values.

12. The system of claim 8, wherein generating, via the prediction model, the possession value metric for each of the one or more events based on the event data and the one or more features includes:

generating via the prediction model, a plurality of decision trees; and analyzing the plurality of decision trees to determine the possession value metric for each of the one or more events.

13. The system of claim 8, wherein the one or more features may include at least one of: an event outcome, an event location, event cross data, event header data, free kick event data, corner kick event data, penalty kick event data, throw-in event data, an event end location, goal distance data, goal angle data, goal location data, event distance data, an event type identifier, previous event distance data, total speed data, or event direction speed data.

14. The system of claim 8, wherein the on-ball event includes at least one of: a pass event, a throw-in event, a corner kick event, a free-kick event, a cross event, a headed-pass event, an off-side pass event, a take-on event, a foul event, a tackle event, an interception event, a clearance event, an aerial event, a ball recovery event, a bad ball handling event, a 50/50 ball event, a blocked pass event, a rebound event, a turnover event, or a screen event.

15. A non-transitory computer readable medium including one or more sequences of instructions that, when executed by one or more processors, causes a computing system to perform operations comprising:

receiving, by a computing system, one or more event indications corresponding to one or more events of a game from a tracking system, wherein each of the one or more event indications corresponds to an on-ball event, and wherein each of the one or more event indications include event data, and wherein the game includes one or more teams, and wherein the one or more teams include one or more players;

generating, by the computing system, one or more features for each of the one or more events based on the corresponding event data;

generating, by the computing system, via a prediction model, a possession value metric for each of the one or more events based on the event data and the one or more features, wherein the possession value metric includes a numerical representation corresponding to a likelihood that a possession team will score within a time period after the one or more events;

aggregating, by the computing system, the possession value metric for each of the one or more events to generate a momentum metric for each of the one or more teams;

generating, by the computing system, a visual representation corresponding to the momentum metric; and outputting, by the computing system, the visual representation to a display of a device.

16. The non-transitory computer readable medium of claim 15, the operations further comprising:

generating, by the computing system, an aggregate possession value for one or more categories for each of the one or more players.

17. The non-transitory computer readable medium of claim 15, wherein the one or more features may include at least one of: an event outcome, an event location, event cross data, event header data, free kick event data, corner kick event data, penalty kick event data, throw-in event data, an event end location, goal distance data, goal angle data, goal location data, event distance data, an event type identifier, previous event distance data, total speed data, or event direction speed data.

18. The non-transitory computer readable medium of claim 15, wherein the on-ball event includes at least one of: a pass event, a throw-in event, a corner kick event, a free-kick event, a cross event, a headed-pass event, an off-side pass event, a take-on event, a foul event, a tackle event, an interception event, a clearance event, an aerial event, a ball recovery event, a bad ball handling event, a 50/50 ball event, a blocked pass event, a rebound event, a turnover event, or a screen event.

19. The non-transitory computer readable medium of claim 15, the operations further comprising:

identifying, by the computing system, a target player of the one or more players on a first team of the one or more teams in at least one of the one or more events;

identifying, by the computing system, a subset of additional events that involve the target player;

generating, by the computing system, a subset of additional target possession values based on the subset of additional events; and generating, by the computing system, a plurality of metrics for the target player based on the subset of additional target possession values.

20. The non-transitory computer readable medium of claim 19, wherein generating, via the prediction model, the possession value metric for each of the one or more events based on the event data and the one or more features includes:

generating, by the computing system, via the prediction model, a plurality of decision trees; and analyzing, by the computing system, the plurality of decision trees to determine the possession value metric for each of the one or more events.

* * * * *